(12) United States Patent
Tsukagoshi

(10) Patent No.: US 12,015,872 B2
(45) Date of Patent: Jun. 18, 2024

(54) TRANSMISSION DEVICE, TRANSMISSION METHOD, RECEPTION DEVICE, AND RECEPTION METHOD

(71) Applicant: SONY GROUP CORPORATION, Tokyo (JP)

(72) Inventor: Ikuo Tsukagoshi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/851,958

(22) Filed: Jun. 28, 2022

(65) Prior Publication Data

US 2022/0360735 A1 Nov. 10, 2022

Related U.S. Application Data

(63) Continuation of application No. 16/827,267, filed on Mar. 23, 2020, now Pat. No. 11,394,920, which is a
(Continued)

(30) Foreign Application Priority Data

Dec. 29, 2014 (JP) ................................. 2014-267034

(51) Int. Cl.
*H04N 7/00* (2011.01)
*G06T 5/50* (2006.01)
(Continued)

(52) U.S. Cl.
CPC ............... *H04N 7/005* (2013.01); *G06T 5/50* (2013.01); *G06T 5/92* (2024.01); *H04L 65/70* (2022.05);
(Continued)

(58) Field of Classification Search
CPC ........ H04N 7/005; H04N 19/46; H04N 5/225; H04N 21/84; H04N 21/434; H04N 21/236;
(Continued)

(56) References Cited

U.S. PATENT DOCUMENTS 7,409,106 B2    8/2008  Aiso
7,483,486 B2 *  1/2009  Mantiuk ............... H04N 19/154
                                                        375/240.03
(Continued)

FOREIGN PATENT DOCUMENTS

CN          1892508 A    1/2007
CN        102177762 A    9/2011
(Continued)

OTHER PUBLICATIONS

T. Borer, "Non-linear Opto-Electrical Transfer Functions for High Dynamic Range Television," BBC Research & Development White Paper, WHP 283, Jul. 2014.
(Continued)

*Primary Examiner* — Philip P. Dang
(74) *Attorney, Agent, or Firm* — Oblon, McClelland, Maier & Neustadt, L.L.P.

(57) ABSTRACT

The present technology ensures that electrooptical conversion processing for transmission video data obtained using an HDR optoelectrical conversion characteristic is favorably carried out at a receiving side. The transmission video data is obtained by performing high dynamic range optoelectrical conversion on high dynamic range video data. A video stream is obtained by applying encoding processing to this transmission video data. A container in a predetermined format including this video stream is transmitted. Meta information indicating an electrooptical conversion characteristic corresponding to a high dynamic range optoelectrical
(Continued)

conversion characteristic is inserted into a parameter set field in the video stream.

10 Claims, 16 Drawing Sheets

Related U.S. Application Data continuation of application No. 15/524,441, filed as application No. PCT/JP2015/085160 on Dec. 16, 2015, now Pat. No. 10,609,327.

(51) Int. Cl.
| | |
|---|---|
| *G06T 5/92* | (2024.01) |
| *H04L 65/70* | (2022.01) |
| *H04N 19/46* | (2014.01) |
| *H04N 19/70* | (2014.01) |
| *H04N 21/236* | (2011.01) |
| *H04N 21/434* | (2011.01) |
| *H04N 21/84* | (2011.01) |
| *H04N 23/00* | (2023.01) |
| *H04N 23/76* | (2023.01) |

(52) U.S. Cl.
CPC ............ *H04N 19/46* (2014.11); *H04N 19/70* (2014.11); *H04N 21/236* (2013.01); *H04N 21/434* (2013.01); *H04N 21/84* (2013.01); *H04N 23/00* (2023.01); *H04N 23/76* (2023.01); *G06T 2207/20208* (2013.01)

(58) Field of Classification Search
CPC ...... H04N 5/243; H04N 19/70; H04L 65/607; G06T 5/50; G06T 5/009; G06T 2207/20208
See application file for complete search history.

(56) References Cited

U.S. PATENT DOCUMENTS

| | | | | |
|---|---|---|---|---|
| 7,532,214 | B2 | 5/2009 | Lundstrom | |
| 8,014,445 | B2* | 9/2011 | Segall | H04N 19/61 |
| | | | | 375/240.01 |
| 8,456,327 | B2* | 6/2013 | Bechtel | G06V 10/147 |
| | | | | 348/297 |
| 8,767,004 | B2* | 7/2014 | Longhurst | G09G 5/026 |
| | | | | 345/589 |
| 8,755,922 | B2 | 10/2014 | Tsubaki | |
| 8,866,922 | B2* | 10/2014 | Tsubaki | G06T 5/50 |
| | | | | 348/222.1 |
| 8,872,677 | B2 | 10/2014 | Litvak | |
| 8,948,254 | B2 | 2/2015 | Nakajima | |
| 8,980,963 | B2 | 3/2015 | Gish | |
| 8,982,963 | B2* | 3/2015 | Gish | H04N 19/30 |
| | | | | 375/240.1 |
| 8,994,556 | B2 | 3/2015 | Lundy | |
| 9,014,533 | B2 | 4/2015 | Doser | |
| 9,020,637 | B2 | 4/2015 | Schnittman | |
| 9,098,906 | B2* | 8/2015 | Bruls | H04N 19/184 |
| 9,137,451 | B2 | 9/2015 | Yang | |
| 9,197,689 | B2 | 11/2015 | Ha et al. | |
| 9,253,497 | B2 | 2/2016 | Hattori | |
| 9,264,683 | B2* | 2/2016 | Hattori | H04N 19/46 |
| 9,292,940 | B2* | 3/2016 | Newton | G06T 5/92 |
| 9,313,396 | B2* | 4/2016 | Koishi | G03B 13/36 |
| 9,384,708 | B2 | 7/2016 | Liu | |
| 9,407,966 | B2* | 8/2016 | Hwang | H04N 21/2362 |
| 9,420,288 | B2* | 8/2016 | Mertens | H04N 19/30 |
| 9,426,382 | B2* | 8/2016 | Matsuoka | H04N 23/6811 |
| 9,451,234 | B2 | 9/2016 | Tsukagoshi | |
| 9,460,664 | B2* | 10/2016 | Kimura | G09G 3/3406 |
| 9,549,015 | B2 | 1/2017 | Yi | |
| 9,571,838 | B2* | 2/2017 | Sato | H04N 19/105 |
| 9,596,449 | B2 | 3/2017 | Tsukagoshi | |
| 9,605,535 | B2 | 3/2017 | Logan | |
| 9,624,871 | B2 | 4/2017 | Melanson | |
| 9,635,377 | B2* | 4/2017 | Kim | H04N 19/463 |
| 9,699,482 | B2* | 7/2017 | Mertens | H04N 19/44 |
| 9,706,184 | B2* | 7/2017 | Uchimura | H04N 9/793 |
| 9,712,781 | B2* | 7/2017 | Oh | H04N 21/234 |
| 9,720,701 | B2 | 8/2017 | Trethewey | |
| 9,736,507 | B2* | 8/2017 | Oh | H04N 21/2362 |
| 9,747,674 | B2* | 8/2017 | Boitard | G06T 5/92 |
| 9,774,819 | B2* | 9/2017 | Yamamoto | H04N 19/30 |
| 9,781,401 | B2* | 10/2017 | Uchimura | H04N 9/793 |
| 9,800,855 | B2* | 10/2017 | Uchimura | H04N 9/8238 |
| 9,826,212 | B2 | 11/2017 | Newton et al. | |
| 9,832,440 | B2* | 11/2017 | Uchimura | H04N 9/8205 |
| 9,860,505 | B2 | 1/2018 | Tsukagoshi | |
| 9,912,945 | B2 | 3/2018 | Rossato | |
| 9,929,940 | B2 | 3/2018 | Singh et al. | |
| 9,986,253 | B2* | 5/2018 | Yamamoto | H04N 19/46 |
| 10,070,125 | B2* | 9/2018 | Hannuksela | H04N 19/42 |
| 10,171,787 | B2* | 1/2019 | Yamamoto | H04N 11/24 |
| 10,194,162 | B2* | 1/2019 | Van Der Vleuten | |
| | | | | G06F 3/1423 |
| 10,230,999 | B2* | 3/2019 | Yoon | H04N 21/2387 |
| 10,306,233 | B2 | 5/2019 | Damkat | |
| 10,499,192 | B2 | 12/2019 | Walter | |
| 10,687,069 | B2* | 6/2020 | Li | H04N 19/70 |
| 2004/0070565 | A1* | 4/2004 | Nayar | G06V 10/60 |
| | | | | 345/156 |
| 2009/0016636 | A1* | 1/2009 | Kasashima | G06V 10/273 |
| | | | | 348/E5.058 |
| 2009/0226152 | A1* | 9/2009 | Hanes | H04N 21/4341 |
| | | | | 386/353 |
| 2010/0172411 | A1 | 7/2010 | Efremov et al. | |
| 2011/0141233 | A1 | 6/2011 | Tsukagoshi | |
| 2011/0141234 | A1 | 6/2011 | Tsukagoshi | |
| 2011/0149024 | A1 | 6/2011 | Tsukagoshi | |
| 2011/0316973 | A1* | 12/2011 | Miller | G09G 5/02 |
| | | | | 348/E13.001 |
| 2012/0314713 | A1 | 12/2012 | Singh | |
| 2013/0170540 | A1* | 7/2013 | Damkat | G09G 3/3426 |
| | | | | 375/240.01 |
| 2013/0250147 | A1 | 9/2013 | Fransson | |
| 2013/0300835 | A1 | 11/2013 | Kinoshita | |
| 2013/0329778 | A1* | 12/2013 | Su | H04N 19/36 |
| | | | | 375/240.01 |
| 2014/0022431 | A1 | 1/2014 | Chen | |
| 2014/0037206 | A1 | 2/2014 | Newton et al. | |
| 2014/0149545 | A1 | 5/2014 | Bouazizi et al. | |
| 2014/0210847 | A1 | 7/2014 | Knibbeler et al. | |
| 2014/0225941 | A1* | 8/2014 | Van Der Vleuten | |
| | | | | G11B 27/105 |
| | | | | 345/690 |
| 2014/0286397 | A1* | 9/2014 | Chen | H04N 13/194 |
| | | | | 375/240.02 |
| 2015/0010059 | A1* | 1/2015 | Hattori | H04N 19/86 |
| | | | | 375/240.02 |
| 2016/0014422 | A1 | 1/2016 | Su | |
| 2016/0161579 | A1 | 6/2016 | Van Den Brink | |
| 2016/0232937 | A1* | 8/2016 | Yamamoto | G11B 27/322 |
| 2016/0277790 | A1 | 9/2016 | Nakajima | |
| 2017/0302920 | A1* | 10/2017 | Pettersson | H04N 19/109 |

FOREIGN PATENT DOCUMENTS

| | | |
|---|---|---|
| CN | 103119936 A | 5/2013 |
| JP | 2009-524371 A | 6/2009 |
| JP | 2013-541895 A | 11/2013 |
| JP | 2014-531821 | 11/2014 |
| WO | 2014/002901 A1 | 1/2014 |
| WO | 2014/178286 A1 | 11/2014 |

OTHER PUBLICATIONS

International Search Report dated Mar. 8, 2016, in PCT/JP2015/085160 filed Dec. 16, 2015.

(56) References Cited

OTHER PUBLICATIONS

Extended European Search Report dated Jun. 6, 2018, in Patent Application No. 15875394.7.
Combined Chinese Office Action and Search Report dated Aug. 1, 2019, in Patent Application No. 201580070114.6 (with English translation).
Office Action dated Jan. 28, 2020, in Japanese Patent Application No. 2016-567301.
Office Action dated Jul. 14, 2020, in corresponding Japanese Patent Application No. 2016-567301.
Borst et al.—"Dynamic Rate Control Algorithms for HDR Throughput Optimization" IEEE Infocom 2001 (pp. 976-985).
T. Moore—"Digital Video: number of bits per sample required for reference coding of luminance and colour-difference signals" (1974) (13 pages).
D. Hoffman et al.—"RTP Payload Format for MPEG1/MPEG2 Video" (1998) (16 pages).

* cited by examiner

FIG. 4A

VUI Transfer characteristics   "New Type"

$V = 1.099 * Lc**0.45 - 0.099$     (for $1 >= Lc >= 0.018$)
$V = 4.500 * Lc$     (for $0.018 > Lc >= 0$)

Reference level = Lr     ( Lx > Lr > Lc )
Threshold level = Lt     ( Ly > Lt > Lr )

FIG. 4B

VUI Transfer characteristics   "New Type"

$V = 1.099 * Lc**0.45 - 0.099$     (for $1 >= Lc >= 0.018$)
$V = 4.500 * Lc$     (for $0.018 > Lc >= 0$)

EXEMPLARY SEI ARRANGEMENT AS HEVC ENCODED STREAM

EXEMPLARY SEI ARRANGEMENT AS HEVC ENCODED STREAM

FIG. 7

Dynamic Range SEI

| Syntax | No. of Bits | Format |
|---|---|---|
| Dynamic Range SEI (){ | | |
| transfer_characteristics | 8 | bslbf |
| number_of_bits | 8 | uimsbf |
| minimum_brightness_value | 16 | uimsbf |
| peak_level | 16 | uimsbf |
| peak_level_brightness | 16 | uimsbf |
| compliant_threshold_level | 16 | uimsbf |
| compliant_threshold_level_value | 16 | uimsbf |
| mapping_protection_flag | 1 | bslbf |
| reserved | 7 | 0x7f |
| } | | |

FIG. 8 semantics

| | |
|---|---|
| transfer_characteristics (8bits) | SPECIFY EOTF CHARACTERISTIC FOR HDR. |
| number_of_bits (8bits) | NUMBER OF ENCODED PIXEL BITS. |
| minimum_brightness_value (16bits) | MINIMUM LEVEL OF BRIGHTNESS (cd/m$^2$) |
| peak_level (16 bits) | RELATIVE VALUE AT MAXIMUM LEVEL (%) |
| peak_level_brightness (16bits) | MAXIMUM LEVEL OF BRIGHTNESS (cd/m$^2$) |
| compliant_threshold_level (16bits) | THRESHOLD DURING DISPLAY LEVEL MAPPING (%) 100% FOR REFERENCE BRIGHTNESS |
| compliant_threshold_level_value (16bits) | BRIGHTNESS FUNCTIONING AS THRESHOLD DURING DISPLAY LEVEL MAPPING (cd/m$^2$) REFERENCE BRIGHTNESS |
| mapping_protection_flag (1bit) | INDICATE WHETHER DISPLAY MAPPING AFTER DECODING IS PROHIBITED.<br>1  DISPLAY MAPPING IS PROHIBITED<br>0  DISPLAY MAPPING IS NOT PROHIBITED |

FIG. 9

High Dynamic Range descriptor

| Syntax | No. of Bits | Format |
|---|---|---|
| High Dynamic Range descriptor(){ | | |
| descriptor_tag | 8 | uimsbf |
| descriptor_length | 8 | uimsbf |
| HDR_flag | 1 | bslbf |
| SDR_compatible_flag | 1 | bslbf |
| mapping_protection flag | 1 | bslbf |
| reserved | 5 | 0x1f |
| } | | |

FIG. 10

| | |
|---|---|
| HDR_flag (1bit) | INDICATE WHETHER SERVICE STREAM IS OF TYPE SUPPORTING HDR. |
| 1 | VIDEO STREAM SUPPORTS HDR AND INDICATE THAT VUI HAS HDR CHARACTERISTIC, OR VUI IS CONVENTIONAL BUT SEI PROVIDES HDR INFORMATION, OR VUI HAS HDR CHARACTERISTIC AND ALSO SEI HAS HDR INFORMATION. |
| 0 | VIDEO STREAM DOES NOT SUPPORT HDR |
| SDR_compatible_flag (1bit) | INDICATE WHETHER SERVICE STREAM HAS DISPLAY COMPATIBILITY WITH SDR IN A CASE WHERE SERVICE STREAM SUPPORTS HDR. |
| 1 | DISPLAY COMPATIBILITY WITH SDR |
| 0 | NO DISPLAY COMPATIBILITY WITH SDR |
| mapping_protection flag (1bit) | INDICATE WHETHER DISPLAY MAPPING IS PROHIBITED IN SERVICE STREAM. |
| 1 | DISPLAY MAPPING IS PROHIBITED |
| 0 | DISPLAY MAPPING IS NOT PROHIBITED |

FIG. 15

HDMI Vendor Specific InfoFrame (FOR HDR)

| Packet Byte # | 7 | 6 | 5 | 4 | 3 | 2 | 1 | 0 |
|---|---|---|---|---|---|---|---|---|
| ... | | | | | | | | |
| PB7 | Display_control_type (3bits) | | | | | | | |
| PB8 | | | | mapping_protection_flag | Display_control_metadata_length = 12 | | | |
| PB8+1 | Transfer characteristics (8bits) | | | | | | | |
| PB8+2 | Number of bits (8bits) | | | | | | | |
| PB8+3 | Minimum brightness value MSB (8bits) | | | | | | | |
| PB8+4 | Minimum brightness value LSB (8bits) | | | | | | | |
| PB8+5 | Peak Level MSB (8bits) | | | | | | | |
| PB8+6 | Peak Level LSB (8bits) | | | | | | | |
| PB8+7 | Peak Level Brightness MSB (8bits) | | | | | | | |
| PB8+8 | Peak Level Brightness LSB (8bits) | | | | | | | |
| PB8+9 | Compliant_threshold_level MSB (8bits) | | | | | | | |
| PB8+10 | Compliant_threshold_level LSB (8bits) | | | | | | | |
| PB8+11 | Compliant_threshold_level Value MSB (8bits) | | | | | | | |
| PB8+12 | Compliant_threshold_level Value LSB (8bits) | | | | | | | |

FIG. 16

HDMI VS Info    Display Control semantics

| | |
|---|---|
| Display_control_type (3bits) | INDICATE CLASSIFICATION OF DISPLAY TYPE. |
| "001" | INDICATE SDR DISPLAY CONTROL. |
| "010" | INDICATE HDR DISPLAY CONTROL. |
| mapping_protection_flag (1bit) | INDICATE WHETHER DISPLAY MAPPING AFTER DECODING IS PROHIBITED. |
| 1 | DISPLAY MAPPING IS PROHIBITED |
| 0 | DISPLAY MAPPING IS NOT PROHIBITED |
| Display_control_metadata_length (5bits) | INDICATE SIZE OF Display_control_metadata. |
| transfer_characteristics (8bits) | SPECIFY EOTF CHARACTERISTIC FOR HDR. |
| number_of_bits (8bits) | NUMBER OF ENCODED PIXEL BITS. |
| minimum_brightness_value (16bits) | MINIMUM LEVEL OF BRIGHTNESS (cd/m²) |
| peak_level (16 bits) | RELATIVE VALUE AT MAXIMUM LEVEL (%) |
| peak_level_brightness (16bits) | MAXIMUM LEVEL OF BRIGHTNESS (cd/m²) |
| compliant_threshold_level (16bits) | THRESHOLD DURING DISPLAY LEVEL MAPPING (%) 100% FOR REFERENCE BRIGHTNESS |
| compliant_threshold_level_value (16bits) | BRIGHTNESS FUNCTIONING AS THRESHOLD DURING DISPLAY LEVEL MAPPING (cd/m²) REFERENCE BRIGHTNESS |

MMT STRUCTURE

TRANSMISSION DEVICE, TRANSMISSION METHOD, RECEPTION DEVICE, AND RECEPTION METHOD

CROSS-REFERENCE TO RELATED APPLICATIONS

This application is a continuation of U.S. application Ser. No. 16/827,267, filed Mar. 23, 2020, which is a continuation of U.S. application Ser. No. 15/524,441, filed May 4, 2017, now U.S. Pat. No. 10,609,327, issued Mar. 31, 2020, which is a National Stage entry under 35 U.S.C. § 371 of PCT/JP2015/085160, filed Dec. 16, 2015, and is based upon and claims the benefit of priority from prior Japanese Patent Application No. 2014-267034, filed Dec. 29, 2014, the entire contents of each of which are incorporated herein by reference.

TECHNICAL FIELD

The present technology relates to a transmission device, a transmission method, a reception device, and a reception method. More specifically, the present technology relates to a transmission device and so on configured to transmit transmission video data obtained by applying high dynamic range optoelectrical conversion to high dynamic range video data.

BACKGROUND ART

Transmitting transmission video data obtained by applying high dynamic range optoelectrical conversion to high dynamic range video data has been considered in the past. Hereinafter, the high dynamic range will be abbreviated as "HDR" as appropriate. For example, Non-patent Document 1 has mentioned an HDR optoelectrical conversion characteristic (new gamma characteristic) including a compatibility field with a conventional optoelectrical conversion characteristic (gamma characteristic), by taking the reception by a conventional reception apparatus into account.

CITATION LIST

Non-Patent Document

Non-patent Document 1: Tim Borer, "Non-Linear Opto-Electrical Transfer Functions for High Dynamic Range Television", Research & Development White Paper WHP 283, July 2014

SUMMARY OF THE INVENTION

Problems to be Solved by the Invention

An object of the present technology is to ensure that electrooptical conversion processing for transmission video data obtained using an HDR optoelectrical conversion characteristic is favorably carried out at a receiving side.

Solutions to Problems

A concept of the present technology is a transmission device including:
an optoelectrical converter that performs high dynamic range optoelectrical conversion on high dynamic range video data to obtain transmission video data;
an encoding unit that applies encoding processing to the transmission video data to obtain a video stream;
a transmitter that transmits a container in a predetermined format including the video stream; and
an information inserter that inserts meta information indicating an electrooptical conversion characteristic corresponding to a characteristic of the high dynamic range optoelectrical conversion into a parameter set field in the video stream.

According to the present technology, the high dynamic range optoelectrical conversion is performed on the high dynamic range video data by the optoelectrical converter, whereby the transmission video data is obtained. The encoding processing is applied to the transmission video data by the encoding unit, whereby the video stream is obtained. The container in the predetermined format including this video stream is transmitted by the transmitter.

The meta information indicating the electrooptical conversion characteristic corresponding to the characteristic of the high dynamic range optoelectrical conversion is inserted into the parameter set field in the video stream by the information inserter. For example, the parameter set field may be a field in an SPS NAL unit.

As described above, the present technology is designed to insert the meta information indicating the electrooptical conversion characteristic corresponding to the characteristic of the high dynamic range optoelectrical conversion into the parameter set field in the video stream. Consequently, electrooptical conversion processing for the transmission video data obtained using the HDR optoelectrical conversion characteristic can be favorably carried out at a receiving side.

In addition, for example, the present technology may be configured in such a manner that the information inserter further inserts, into a layer of the container, identification information indicating that the video stream supports the high dynamic range. This identification information allows the receiving side to easily recognize that the video stream supports the high dynamic range, whereby it is made possible to extract the meta information indicating the electrooptical conversion characteristic corresponding to the characteristic of the high dynamic range optoelectrical conversion from the parameter set field in the video stream and perform proper electrooptical conversion on the transmission video data.

For example, this case may be configured in such a manner that information indicating whether the video stream has display compatibility with a normal dynamic range is added to the identification information. Alternatively, for example, this case may be configured in such a manner that information indicating whether display brightness adjustment for the video stream is prohibited is added to the identification information.

Additionally, for example, this case may be configured in such a manner that the container is a transport stream, and the information inserter inserts the identification information into a section belonging to one of a program map table and an event information table. Furthermore, for example, this case may be configured in such a manner that the container is an MMT stream, and the information inserter inserts the identification information into a section belonging to an MMT package table.

Meanwhile, for example, the present technology may be configured in such a manner that the information inserter further inserts the meta information for display control into a field different from the parameter set field in the video stream. For example, this case may be configured in such a manner that the meta information for display control includes peak brightness information. Alternatively, for example, this case may be configured in such a manner that the meta information for display control includes field information indicating a field where the display brightness adjustment is allowed. In this case, it is made possible to properly carry out display control using the meta information for display control.

Additionally, for example, this case may be configured in such a manner that the meta information for display control includes information indicating whether display brightness adjustment for the video stream is prohibited. With this, adjustment exceeding the intent of a creator can be suppressed regarding the display brightness, or alternatively, eye fatigue of a viewer can be suppressed.

Meanwhile, another concept of the present technology is a reception device including:
 a receiver that receives a container in a predetermined format including a video stream obtained by encoding transmission video data;
 a decoding unit that applies decoding processing to the video stream to obtain the transmission video data; and
 an electrooptical converter that performs electrooptical conversion on the transmission video data obtained at the decoding unit to obtain display video data, in which
 the transmission video data is data obtained by applying high dynamic range optoelectrical conversion to high dynamic range data, and
 meta information indicating an electrooptical conversion characteristic corresponding to a characteristic of the high dynamic range optoelectrical conversion is inserted into a parameter set field in the video stream,
 the reception device further including an information extractor that extracts the meta information from the video stream, in which
 the electrooptical converter uses the electrooptical conversion characteristic indicated by the meta information extracted at the information extractor.

According to the present technology, the container in the predetermined format including the video stream obtained by encoding the transmission video data is received by the receiver. The decoding processing is applied to the video stream by the decoding unit, whereby the transmission video data is obtained. Subsequently, the electrooptical conversion is performed on the transmission video data by the electrooptical converter, whereby the display video data is obtained.

The transmission video data is data obtained by applying the high dynamic range optoelectrical conversion to the high dynamic range data. The meta information indicating the electrooptical conversion characteristic corresponding to the characteristic of the high dynamic range optoelectrical conversion is inserted into the parameter set field in the video stream. The meta information is extracted from the video stream by the information extractor. In the electrooptical converter, the electrooptical conversion characteristic indicated by this meta information is used to apply the electrooptical conversion to the transmission video data. For example, the parameter set field may be a field in an SPS NAL unit.

As described above, the present technology is designed to extract the meta information indicating the electrooptical conversion characteristic corresponding to the characteristic of the high dynamic range optoelectrical conversion from the parameter set field in the video stream such that the electrooptical conversion characteristic indicated by this meta information is used to perform the electrooptical conversion on the transmission video data. Consequently, electrooptical conversion processing for the transmission video data obtained using the characteristic of the high dynamic range optoelectrical conversion can be favorably carried out.

In addition, for example, the present technology may be configured in such a manner that identification information indicating that the video stream supports the high dynamic range is inserted into a layer of the container, and the information extractor extracts the meta information from the parameter set field in the video stream on the basis of the identification information. In this case, the meta information is correctly extracted from the parameter set field in the video stream and accordingly, it is made possible to perform proper electrooptical conversion on the transmission video data.

Meanwhile, for example, the present technology may be configured in such a manner that the meta information for display control is included in a field different from the parameter set field in the video stream, and a brightness adjustment unit is further provided, which adjusts display brightness of the display video data on the basis of the meta information for display control. For example, this case may be configured in such a manner that the meta information for display control includes field information indicating a field where the display brightness adjustment is allowed, and the brightness adjustment unit adjusts the display brightness of the field where the display brightness adjustment is allowed. In this case, the display brightness can be properly adjusted.

Alternatively, for example, this case may be configured in such a manner that information indicating whether the display brightness adjustment for the video stream is prohibited is inserted into a layer of the container and/or a layer of the video stream, and the brightness adjustment unit does not adjust the display brightness of the display video data in a case where the information indicating whether the display brightness adjustment for the video stream is prohibited indicates the prohibition thereof. With this, adjustment exceeding the intent of a creator can be suppressed regarding the display brightness, or alternatively, eye fatigue of a viewer can be suppressed.

Effects of the Invention

According to the present technology, the electrooptical conversion processing for the transmission video data obtained using the HDR optoelectrical conversion characteristic can be favorably carried out at the receiving side. Note that the effects described in the present description merely serve as examples and not construed to be limited. There may be an additional effect as well.

BRIEF DESCRIPTION OF DRAWINGS

FIGS. 4A and 4B are diagrams for explaining that a reference level "Reference level" and a threshold level "Threshold level" can be directly or indirectly specified depending on types of HDR electrooptical conversion characteristics.

FIG. 7 is a diagram illustrating an exemplary structure of a dynamic range SEI message.

FIG. 8 is a diagram illustrating content of primary information in the exemplary structure of the dynamic range SEI message.

FIG. 9 is a diagram illustrating an exemplary structure of a high dynamic range descriptor.

FIG. 10 is a diagram illustrating content of primary information in the exemplary structure of the high dynamic range descriptor.

FIG. 13 is a diagram for explaining a characteristic of the HDR electrooptical conversion, HDR display mapping processing and so on.

FIG. 15 is a diagram illustrating exemplary structures of a seventh byte and subsequent bytes in a packet of "Vender Specific InfoFrame" sent from a set top box to a monitor.

FIG. 16 is a diagram illustrating content of primary information in the respective exemplary structures in the packet of "Vender Specific InfoFrame".

MODE FOR CARRYING OUT THE INVENTION

Modes for carrying out the invention (hereinafter, referred to as "embodiments") will be described below. Note that the description will be given in the following order.
1. Embodiment
2. Variation

1. EMBODIMENT

[Exemplary Configuration of Transmission/Reception system]

Figure 1:
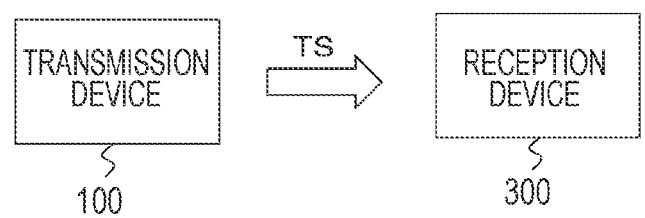
FIG. 1 is a block diagram illustrating an exemplary configuration of a transmission/reception system serving as an embodiment.

FIG. 1 illustrates an exemplary configuration of a transmission/reception system 10 serving as an embodiment. This transmission/reception system 10 is constituted by a transmission device 100 and a reception device 200.

The transmission device 100 generates a transport stream TS in MPEG2 as a container and incorporates this transport stream TS into a broadcasting wave or a packet in a network to transmit. This transport stream TS includes a video stream obtained by applying encoding processing to a transmission video data obtained by performing HDR optoelectrical conversion on HDR video data.

Meta information indicating an electrooptical conversion characteristic corresponding to an HDR optoelectrical conversion characteristic is inserted into a parameter set field in the video stream. In addition, identification information indicating that the video stream supports HDR is inserted into a layer of the container. This identification information includes information indicating whether the video stream has display compatibility with a normal dynamic range, information indicating whether display brightness adjustment for the video stream is prohibited and so on. Hereinafter, the normal dynamic range will be abbreviated as "LDR" as appropriate.

Meanwhile, information for display control is inserted into a field different from the parameter set field in the video stream. This meta information for display control includes peak brightness information, field information indicating a field where the display brightness adjustment is allowed, information indicating whether the display brightness adjustment for the video stream is prohibited and so on.

The reception device 200 applies decoding processing to the video stream included in the received container to obtain the transmission video data. The reception device 200 performs optoelectrical conversion on the transmission video data on the basis of a transmission conversion characteristic indicated by the meta information inserted into the parameter set field in the video stream, thereby obtaining display video data. In this case, the reception device 200 extracts the meta information inserted into the parameter set field in the video stream, on the basis of the identification information inserted into the layer of the container to indicate that the video stream supports the high dynamic range.

The reception device 200 also carries out display mapping processing on the display video data, namely, adjusts the display brightness thereof on the basis of the information for display control inserted into the parameter set field in the video stream. In a case where information inserted into the layer of the container and/or a layer of the video stream to indicate whether the display brightness adjustment is prohibited indicates the prohibition thereof, this display brightness adjustment is not carried out.

[Exemplary Configuration of Transmission Device]

Figure 2:
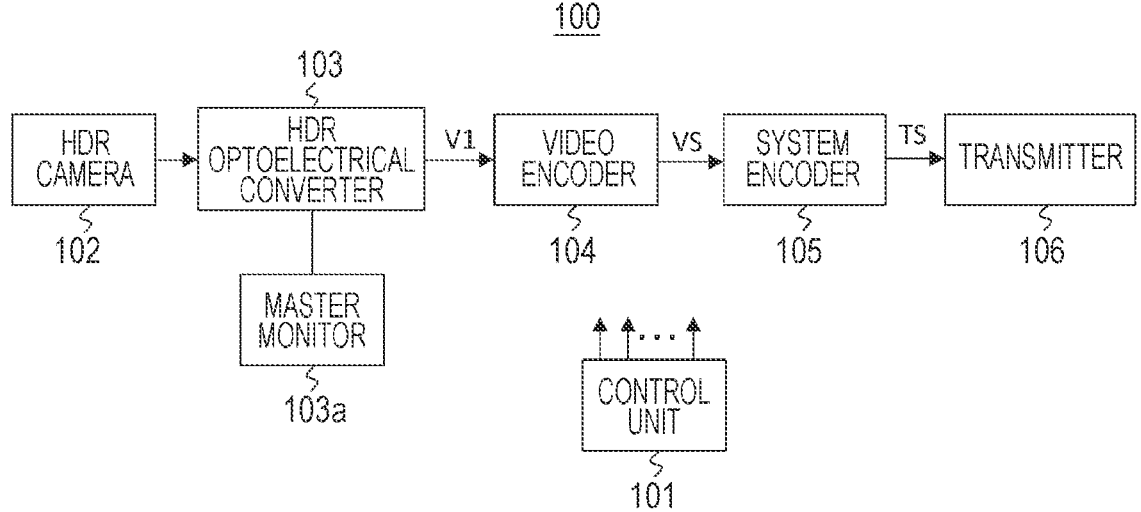
FIG. 2 is a block diagram illustrating an exemplary configuration of a transmission device constituting the transmission/reception system.

FIG. 2 illustrates an exemplary configuration of the transmission device 100. This transmission device 100 has a control unit 101, an HDR camera 102, an HDR optoelectrical converter 103, a video encoder 104, a system encoder 105, and a transmitter 106. The control unit 101 includes a central processing unit (CPU) in the configuration thereof and controls actions of respective members in the transmission device 100 on the basis of a control program.

The HDR camera 102 images an object and outputs high dynamic range (HDR) video data. This HDR video data has a contrast ratio exceeding the brightness of a white peak of a conventional SDR image, specifically, 0 to 100%*N (where N is a numeral larger than one) such as 0 to 1000%. For example, a level of 100% here equivalents to a white brightness value of 100 cd/m$^2$.

A master monitor 103a is a monitor used to carry out grading on the HDR video data obtained at the HDR camera 102. This master monitor 103a has a display brightness level supporting the HDR video data or suitable for the grading of the HDR video data.

Figure 3:
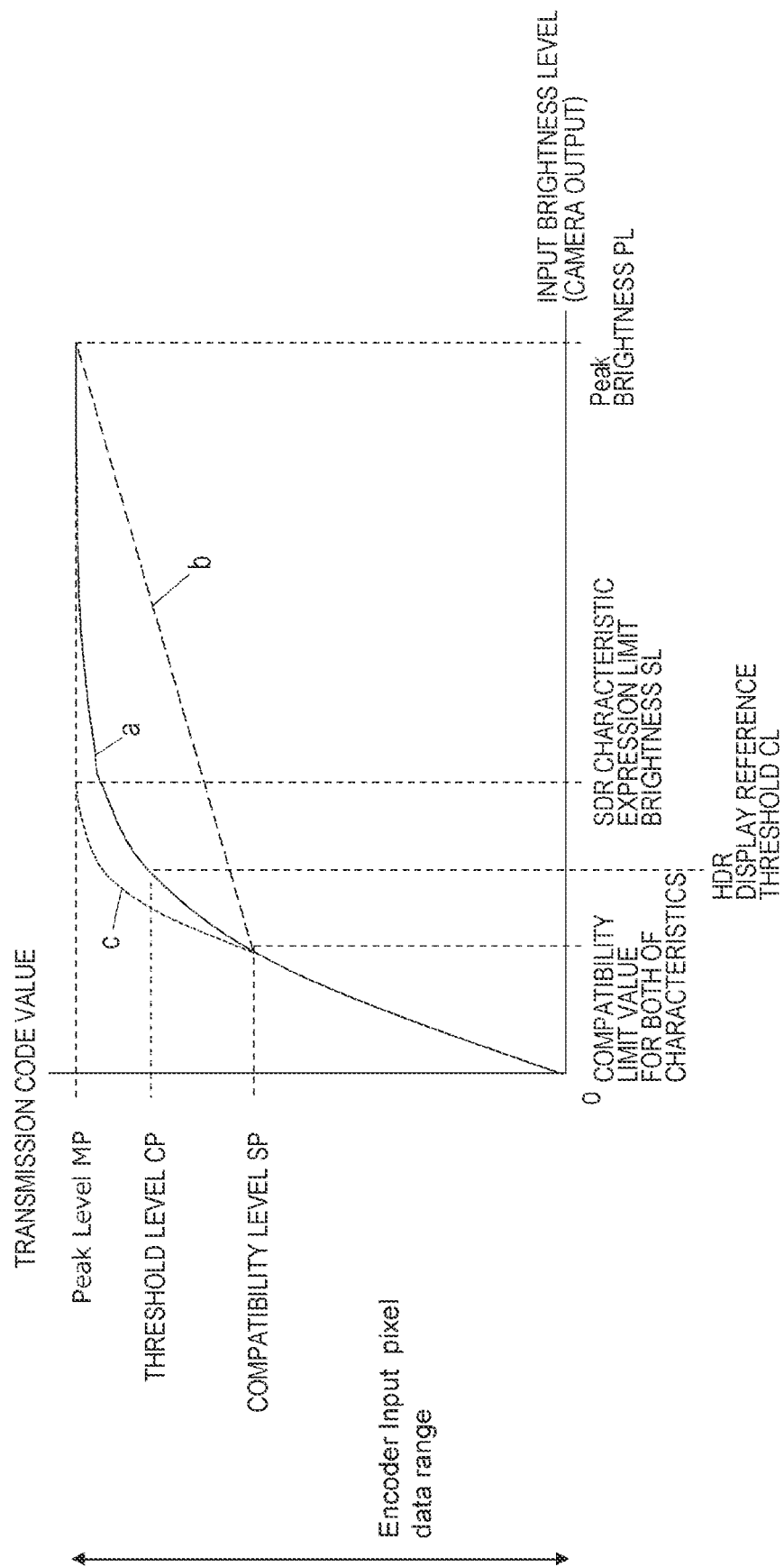
FIG. 3 is a diagram for explaining a characteristic of HDR optoelectrical conversion.

The HDR optoelectrical converter 103 applies the HDR optoelectrical conversion characteristic to the HDR video data obtained at the HDR camera 102 to obtain transmission video data V1. Both of a solid line a and a dashed line b in FIG. 3 represent examples of HDR OETF curves indicating the HDR optoelectrical conversion characteristics. Meanwhile, a dashed line c in FIG. 3 is an SDR OETF curve indicating an SDR optoelectrical conversion characteristic. In FIG. 3, a lateral axis represents an input brightness level, whereas a longitudinal axis represents a transmission code value.

The HDR optoelectrical conversion characteristic can be configured so as to include a compatibility field with the SDR optoelectrical conversion characteristic, as in the HDR optoelectrical conversion characteristics indicated by the aforementioned solid line a and dashed line b in FIG. 3. In other words, the curved lines of both of the characteristics match with each other until the input brightness level reaches a compatibility limit value for both of the characteristics. At a point where the input brightness level reaches the compatibility limit value, the transmission code value is obtained as a compatibility level SP. According to the HDR optoelectrical conversion characteristic, at a point where the input brightness level reaches peak brightness PL, the transmission code value is obtained as a peak level MP.

An HDR display reference threshold CL represents an boundary between a field where matching brightness is required and a field where the dependency on the CE monitor is allowed as brightness used for display on a monitor of a reception apparatus (CE monitor). At a point where the input brightness level reaches the HDR display reference threshold CL, the transmission code value is obtained as a threshold level CP in, for example, the HDR OETF curve by the solid line a in FIG. 3. Meanwhile, according to the SDR optoelectrical conversion characteristic, at a point where the input brightness level reaches SDR characteristic expression limit brightness SL, the transmission code value is obtained as the peak level MP. SL here is assigned to 100 cd/m². Note that the HDR display reference threshold CL can be also configured to match the compatibility limit value and, in this case, the threshold level CP can be substituted by the compatibility level SP.

Referring back to FIG. 2, the video encoder 104 applies the encoding such as MPEG4-AVC or HEVC to the transmission video data V1 to obtain encoded video data. This video encoder 104 also uses a stream formatter (not illustrated) included therein in a latter stage to generate the video stream including this encoded video data (video elementary stream).

At this time, the video encoder 104 inserts the meta information indicating an HDR electrooptical conversion characteristic corresponding to the HDR optoelectrical conversion characteristic into the parameter set field in the video stream. The video encoder 104 according to this embodiment inserts meta information "Transfer characteristics" into a field for video usability information (VUI) in an SPS NAL unit in an access unit (AU).

This meta information "Transfer characteristics" specifies the HDR electrooptical conversion characteristic. Specifically, the above-mentioned "Transfer characteristics" represents "New Type" as a type of the HDR electrooptical conversion characteristic. In this case, a reference level "Reference level" and a threshold level "Threshold level" can be directly or indirectly specified. The reference level "Reference level" here is assigned to, for example, 100% equivalent to a white brightness value of 100 cd/m². Meanwhile, the threshold level "Threshold level" represents an boundary between a field where matching brightness is required and a field where the dependency on the CE monitor is allowed as brightness used for display on the monitor of the reception apparatus (CE monitor).

In the case of the direct specification, "Reference level" and "Threshold level" are assumed to be defined as identification values in the VUI, as illustrated in FIG. 4(a). This case indicates that respective elements are mentioned in semantics rules for the VUI to be referenced. Note that "Reference level" and "Threshold level" do not necessarily need to be separately determined but one of the levels can be determined by setting "Reference level"="Threshold level".

In the case of the indirect specification, "Reference level" and "Threshold level" are not assumed to be defined as the identification values in the VUI, as illustrated in FIG. 4(b). In this case, respective elements are not mentioned in the semantics rules for the VUI. This case indicates that Reference level=$Lr(Lx>Lr>Lc)$ Threshold level=$Lt(Ly>Lt>Lr)$ are determined in a standard defining "Transfer characteristics" specified in the VUI as characteristics of "New Type". Note that "Reference level" and "Threshold level" do not necessarily need to be separately determined but one of the levels can be determined by setting "Reference level"="Threshold level".

Additionally, the video encoder 104 inserts the meta information for display control into a field other than the parameter set field in the video stream. The video encoder 104 according to this embodiment inserts a dynamic range SEI message (Dynamic Range SEI message) to be newly defined into a section of "SEIs" in the access unit (AU).

Figure 5:
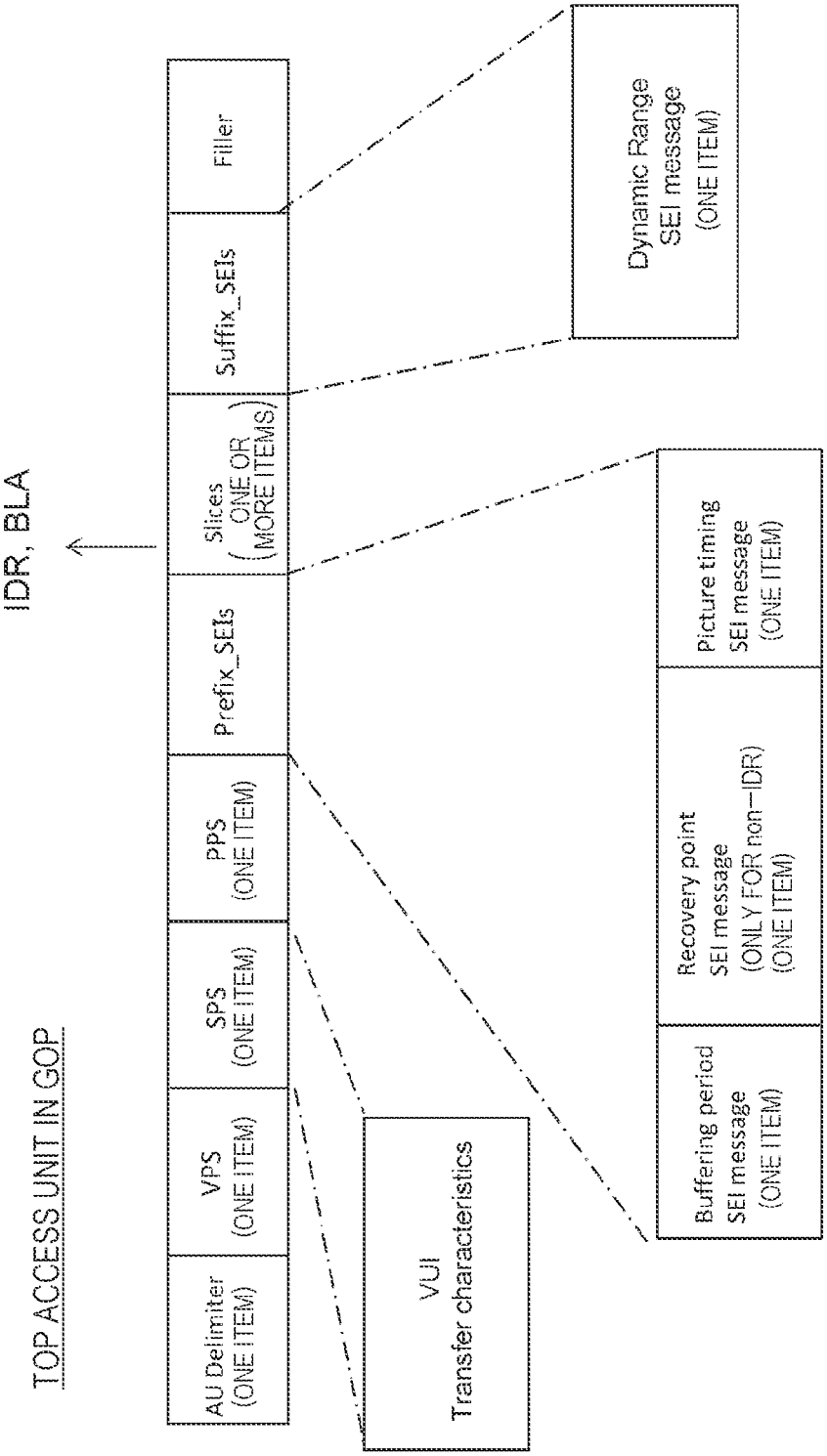
FIG. 5 is a diagram illustrating a top access unit in a GOP in a case where an HEVC encoding technique is used.
Figure 6:
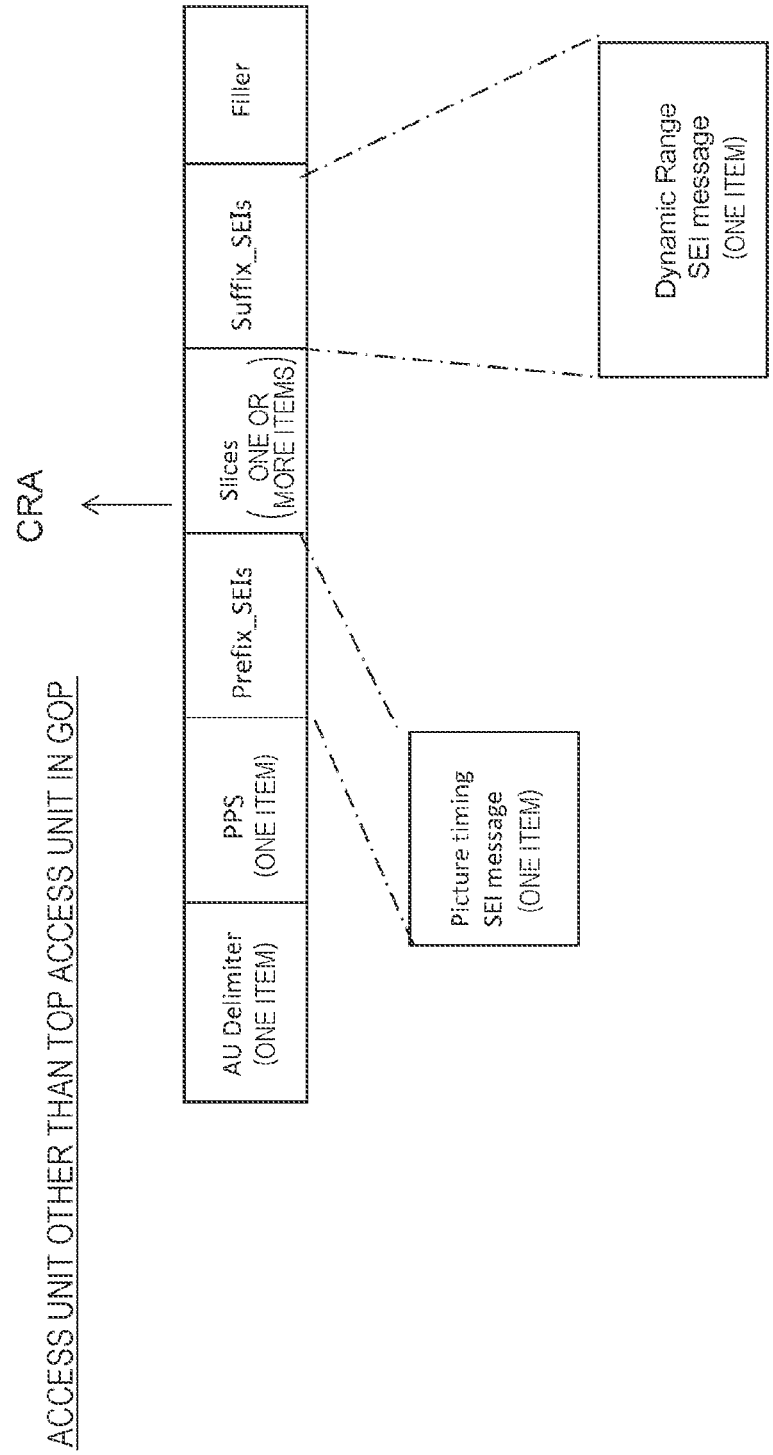
FIG. 6 is a diagram illustrating an access unit other than the top access unit in the GOP in a case where the HEVC encoding technique is used.

FIG. 5 illustrates a top access unit in a group of pictures (GOP) in a case where an HEVC encoding technique is used. Meanwhile, FIG. 6 illustrates an access unit other than the top access unit in the GOP in a case where the HEVC encoding technique is used. In the case of the HEVC encoding technique, an SEI message group "Prefix SEIs" for decoding is arranged before slices (Slices) in which pixel data is encoded, whereas an SEI message group "Suffix SEIs" for display is arranged after the above-mentioned slices (Slices). As illustrated in FIGS. 5 and 6, the dynamic range SEI message may be configured to be arranged as the SEI message group "Suffix_SEIs".

FIG. 7 illustrates an exemplary structure (Syntax) of the dynamic range SEI message. FIG. 8 illustrates content of primary information (Semantics) in the above exemplary structure. An eight-bit field of "transfer characteristics" specifies the HDR electrooptical conversion characteristic. Specifically, this field represents "New Type" as a type of the HDR electrooptical conversion characteristic.

An eight-bit field of "number_of_bits" represents the number of encoded pixel bits. A sixteen-bit field of "minimum_brightness_value" represents a minimum level of the brightness (cd/m²). A sixteen-bit field of "peak_level" represents a relative value (%) at a maximum level. A sixteen-bit field of "peak_level_brightness" represents a maximum level of the brightness (cd/m²) and corresponds to the peak brightness PL in FIG. 3.

A sixteen-bit field of "compliant_threshold_level" represents a threshold (%) during display level mapping. A sixteen-bit field of "compliant_threshold_level_value" represents the brightness (cd/m²) functioning as the threshold during the display level mapping and corresponds to the HDR display reference threshold CL in FIG. 3. Note that threshold information constituted by "Compliant_threshold_level" and "Compliant_threshold_level_value" can be sent as 100% indicating reference brightness and the reference brightness, respectively. A flag of "mapping_protection_flag" indicates whether display mapping (display brightness adjustment) after decoding is prohibited. "1" indicates that the display mapping is prohibited. "0" indicates that the display mapping is not prohibited.

Referring back to FIG. 2, the system encoder 105 generates the transport stream TS including the video stream VS generated at the video encoder 104. Subsequently, the transmitter 106 incorporates this transport stream TS into a broadcasting wave or a packet in a network to transmit to the reception device 200.

At this time, the system encoder 105 inserts, into the layer of the transport stream (container), the identification information indicating that the video stream supports the high dynamic range. The system encoder 105 according to this embodiment inserts a high dynamic range descriptor (High Dynamic Range descriptor) into a section belonging to a program map table (PMT) or a section belonging to an event information table (EIT).

FIG. 9 illustrates an exemplary structure (Syntax) of the high dynamic range descriptor. FIG. 10 illustrates content of primary information (Semantics) in the above exemplary structure. An eight-bit field of "descriptor_tag" represents a descriptor type and here indicates that the high dynamic range descriptor is used. An eight-bit field of "descriptor_length" represents a length (size) of the descriptor and indicates the number of subsequent bytes as the length of the descriptor.

A flag of "HDR_flag" indicates whether a service stream (video stream) is of a type supporting the HDR. "1" indicates that the video stream supports the HDR and additionally indicates whether the VUI has the HDR characteristic, or the VUI is conventional but the SEI provides HDR information, or the VUI has the HDR characteristic and also the SEI has the HDR information. "0" indicates that the video stream does not support the HDR.

A flag of "SDR_compatible_flag" indicates whether the service stream (video stream) has the display compatibility with the SDR in a case where the service stream (video stream) supports the HDR. "1" indicates that the service stream (video stream) has the display compatibility with the SDR. "0" indicates that the service stream (video stream) does not have the display compatibility with the SDR. A flag of "mapping_protection_flag" indicates whether the display mapping (display brightness adjustment) is prohibited in the service stream (video stream). "1" indicates that the display mapping is prohibited. "0" indicates that the display mapping is not prohibited.

An action of the transmission device 100 illustrated in FIG. 2 will be briefly described. The HDR video data obtained through imaging by the HDR camera 102 is supplied to the HDR optoelectrical converter 103. The HDR video data obtained at the HDR camera 102 is subjected to the grading using the master monitor 103*a*. In this HDR optoelectrical converter 103, the HDR optoelectrical conversion characteristic (HDR OETF curve) is applied to this HDR video data while the optoelectrical conversion is performed such that the transmission video data V1 is obtained. This transmission video data V1 is supplied to the video encoder 104.

In the video encoder 104, the encoding such as MPEG4-AVC or HEVC is applied to the transmission video data V1 such that the encoded video data is obtained. In addition, in this video encoder 104, the video stream including this encoded video data is generated by the stream formatter included therein in a latter stage.

At this time, in the video encoder 104, the meta information indicating the HDR electrooptical conversion characteristic corresponding to the HDR optoelectrical conversion characteristic is inserted into the layer of the video stream. Specifically, in the video encoder 104, the meta information "Transfer characteristics" is inserted into a field for the video usability information (VUI) in the SPS NAL unit in the access unit (AU).

Additionally, in the video encoder 104, the meta information for display control is inserted into the layer of the video stream. Specifically, in the video encoder 104, the high dynamic range SEI message to be newly defined is inserted into a section of "SEIs" in the access unit (AU).

The video stream VS generated at the video encoder 104 is supplied to the system encoder 105. In this system encoder 105, the transport stream TS in MPEG2 including the video stream is generated. This transport stream TS is incorporated into the broadcasting wave or a packet in a network by the transmitter 106 to be transmitted to the reception device 200.

At this time, in the system encoder 105, the identification information indicating that the video stream supports the high dynamic range is inserted into the layer of the transport stream (container). Specifically, in the system encoder 105, the high dynamic range descriptor (High Dynamic Range descriptor) is inserted into a section belonging to the program map table (PMT) or a section belonging to the event information table (EIT).

[Configuration of Transport Stream TS]

Figure 11:
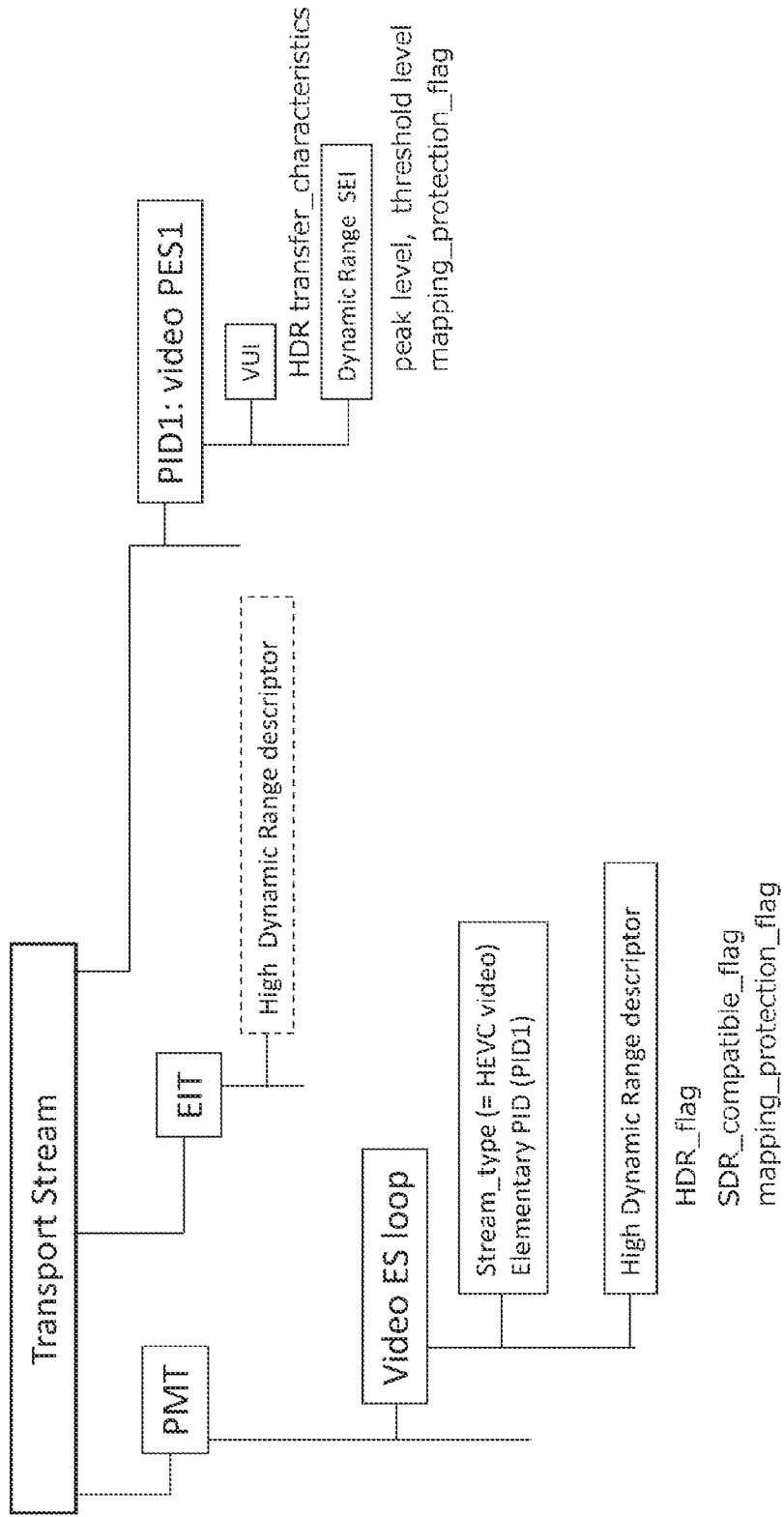
FIG. 11 is a diagram illustrating an exemplary configuration of a transport stream.

FIG. 11 illustrates an exemplary configuration of the transport stream TS. According to this exemplary configuration, there is a PES packet "video PES1" for the video stream identified by PID1. The meta information "Transfer characteristics" specifying the HDR electrooptical conversion characteristic is inserted into a field for the VUI in the SPS in the access unit. Meanwhile, the dynamic range SEI message in which the peak level "Peak level", the threshold level "Threshold level", a mapping protection flag "mapping protection flag" and so on are stated is inserted into the access unit.

Additionally, the program map table (PMT) is included in the transport stream TS as program specific information (PSI). The PSI is information mentioning which program is the one to which each of the elementary streams included in the transport stream belongs. The PMT has a program loop stating information relating to the whole program.

The PMT has an elementary stream loop having information relating to each of the elementary streams. According to this exemplary configuration, there is a video elementary stream loop (Video ES loop) corresponding to the video stream. Information such as a stream type and a packet identifier (PID) is arranged in the video elementary stream loop (Video ES loop) so as to correspond to the video stream and at the same time, the descriptor stating information relating to this video stream is also arranged therein.

The value of "Stream_type" for this video stream is set to, for example, a value indicating an HEVC video stream, whereas the PID information is configured so as to indicate PID1 given to a PES packet "video PES" in the video stream. The high dynamic range descriptor in which an HDR flag "HDR_flag", an SDR compatible flag "SDR_compatible_flag", the mapping protection flag "mapping_protection_flag" and so on are stated is inserted as one of the descriptors.

Additionally, the event information table (EIT) serving as service information (SI) managing each of events (video programs) is included in the transport stream TS. Inserting the high dynamic range descriptor into a section belonging to this EIT is also acceptable.

[Exemplary Configuration of Reception Device]

Figure 12:
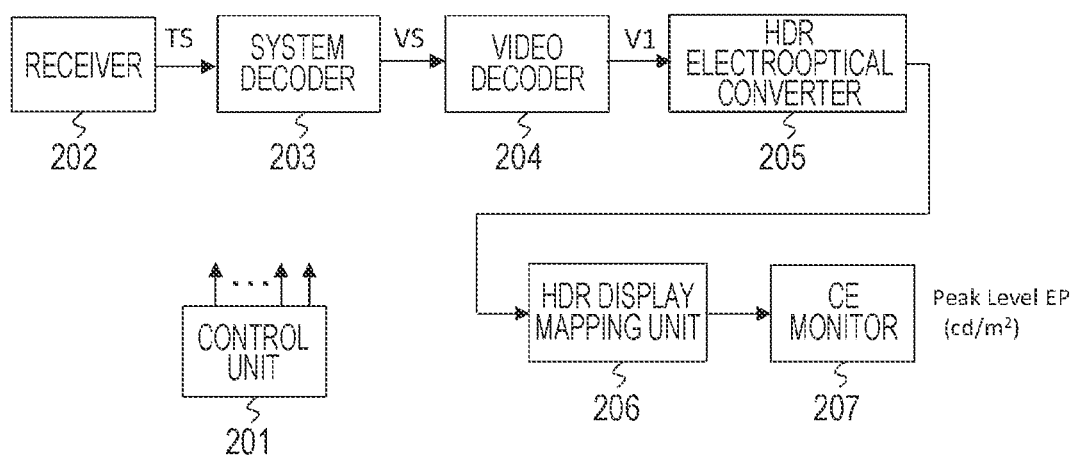
FIG. 12 is a block diagram illustrating an exemplary configuration of a reception device constituting the transmission/reception system.

FIG. 12 illustrates an exemplary configuration of the reception device 200. This reception device 200 has a control unit 201, a receiver 202, a system decoder 203, a video decoder 204, an HDR electrooptical converter 205, an HDR display mapping unit 206, and a CE monitor 207. The control unit 201 includes a central processing unit (CPU) in the configuration thereof and controls actions of respective members in the reception device 200 on the basis of a control program.

The receiver 202 receives the transport stream TS sent from the transmission device 100 by being incorporated into the broadcasting wave or a packet in a network. The system decoder 203 extracts the video stream (elementary stream) VS from this transport stream TS. The system decoder 203 also extracts various items of information inserted into the layer of the container (transport stream) to send to the control unit 201.

In the embodiment, this extracted information includes the information in the high dynamic range descriptor (refer to FIG. 9) as well. The control unit 201 recognizes that the video stream supports the HDR, while also recognizing that the SEI (dynamic range SEI) should be referenced during the HDR display, since the "HDR flag" in the high dynamic range descriptor is assigned to "1".

The video decoder 204 carries out decoding processing on the video stream VS extracted at the system decoder 203 to output the transmission video data V1. The video decoder 204 also extracts the parameter set and the SEI message inserted into each of the access units constituting the video stream VS to send to the control unit 201.

According to the embodiment, as described above, the control unit 201 recognizes that the video stream supports the HDR, while also recognizing that the SEI should be referenced during the HDR display. Accordingly, the meta information "Transfer characteristics" specifying the HDR electrooptical conversion characteristic, which is inserted into a field for the VUI in the SPS NAL unit, as well as the dynamic range SEI message (refer to FIG. 7) are correctly extracted.

The control unit 201 sets the HDR electrooptical converter 205 with the HDR electrooptical conversion characteristic specified by the meta information "Transfer characteristics", namely, the HDR electrooptical conversion characteristic corresponding to the HDR optoelectrical conversion characteristic used at a transmitting side. The HDR electrooptical converter 205 applies the set HDR electrooptical conversion characteristic to the transmission video data V1 output from the video decoder 204 to obtain the display video data for displaying an HDR image.

Figure 13:
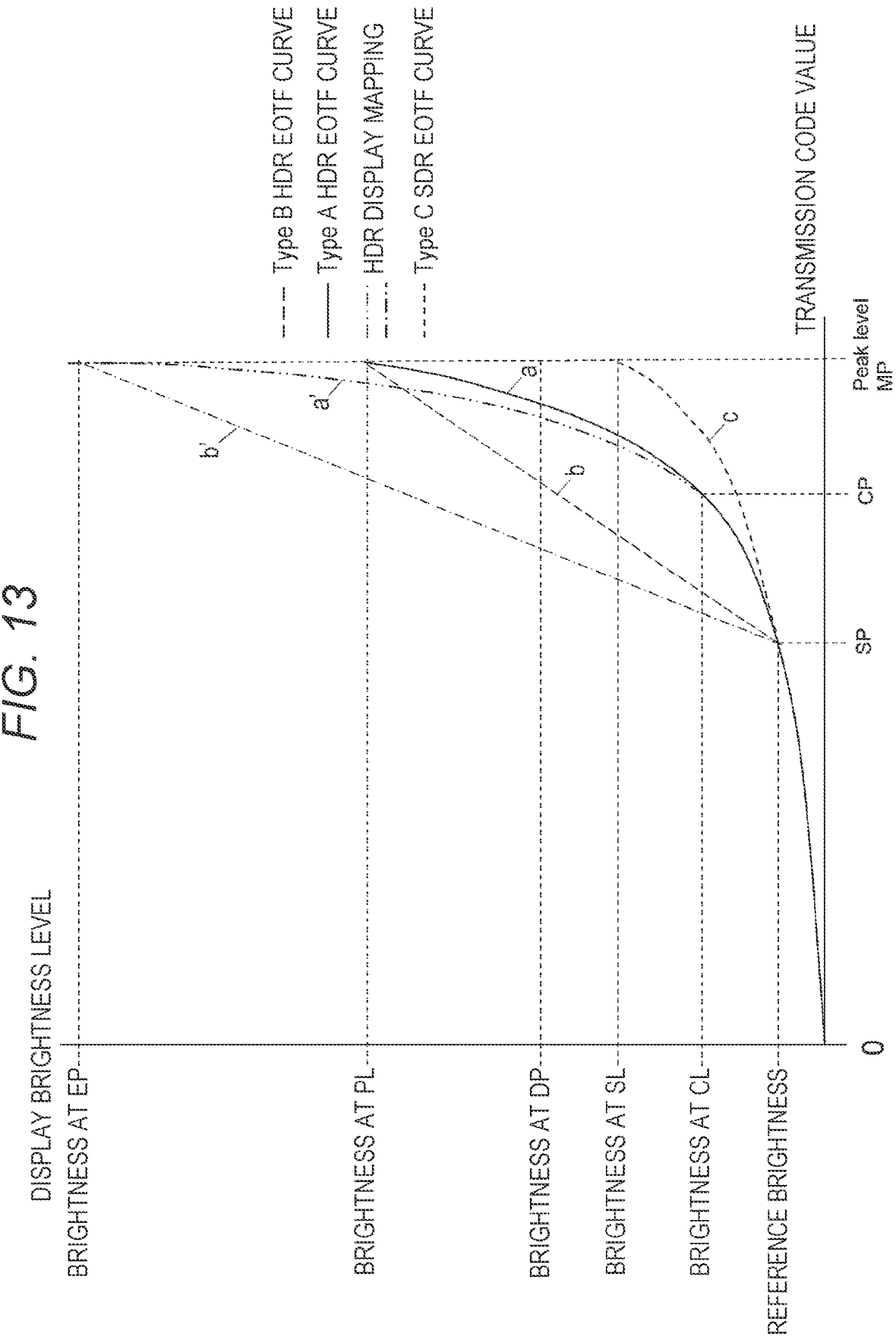

A solid line a in FIG. 13 represents an HDR EOTF curve (Type A) indicating the HDR electrooptical conversion characteristic. This HDR EOTF curve (Type A) corresponds to the HDR OETF curve indicated by the solid line a in FIG. 3. Meanwhile, a dashed line b in FIG. 13 represents an HDR EOTF curve (Type B) indicating another HDR electrooptical conversion characteristic. This HDR EOTF curve (Type B) corresponds to the HDR OETF curve indicated by the dashed line b in FIG. 3. In addition, a dashed line c in FIG. 13 represents an SDR EOTF curve (Type C) corresponding to the SDR OETF curve indicated by the dashed line c in FIG. 3.

According to the HDR electrooptical conversion characteristic, at a point where the transmission code value reaches the peak level MP, the display brightness level is obtained as PL. Meanwhile, at a point where the transmission code value reaches the threshold level CP, an output brightness level is obtained as the HDR display reference threshold CL. Additionally, in FIG. 13, in the case of the HDR EOTF curve (Type A), brightness mapping such as one indicated by a two-dot chain line a' is performed at a display side until reaching the display brightness level EP as long as the threshold level CP and the HDR display reference threshold CL are provided and mapping protection is not enabled. Compared to this, in the case of the HDR EOTF curve (Type B), brightness mapping such as one indicated by a one-dot chain line b' is performed at a display side until reaching the display brightness level EP as long as the compatibility level SP and the reference level defined therefor are detected and the mapping protection is not enabled. Note that, as described earlier, the threshold CL represents an boundary between a field where matching brightness is required and a field where the dependency on the CE monitor is allowed as brightness used for display on the monitor of the reception apparatus (CE monitor).

Brightness information on PL and CL is included in the dynamic range SEI message inserted into the layer of the video stream as the meta information for display control (refer to FIG. 7). The HDR display mapping unit 206 adjusts the display brightness of the display video data obtained at the HDR electrooptical converter 205 on the basis of the meta information for display control. Specifically, in a case where the CE monitor 207 has maximum brightness display capability equal to EP higher than PL, it is also made possible for the HDR display mapping unit 206 to carry out, as one approach for a display function, the display mapping processing, namely, the display brightness adjustment processing such that a maximum display brightness level is shifted to EP for levels exceeding the brightness at CL from among the output brightness levels of the HDR electrooptical converter 205. The two-dot chain line a' in FIG. 13 represents an example of the display brightness adjustment processing in this case.

In addition, the HDR display mapping unit 206 does not carry out the display brightness adjustment processing on the basis of the control of the control unit 201 in a case where "mapping protection flag" in the high dynamic range descriptor and the dynamic range SEI message is assigned to "1" to indicate that the display mapping is prohibited. With this, adjustment exceeding the intent of a creator is suppressed regarding the display brightness, or alternatively, eye fatigue of a viewer is suppressed.

An action of the reception device 200 illustrated in FIG. 12 will be briefly described. In the receiver 202, the transport stream TS sent from the transmission device 100 by being incorporated into the broadcasting wave or a packet in a network is received. This transport stream TS is supplied to the system decoder 203. In the system decoder 203, the video stream VS is extracted from this transport stream TS.

Additionally, in the system decoder 203, various items of information inserted into the layer of the container are extracted to be sent to the control unit 201. This extracted information includes the information in the high dynamic range descriptor (refer to FIG. 9) as well. In the control unit 201, a fact that the video stream supports the HDR is recognized on the basis of the "HDR flag" in the high dynamic range descriptor being assigned to "1", while a fact that the SEI should be referenced during the HDR display is also recognized similarly.

The video stream VS extracted at the system decoder 203 is supplied to the video decoder 204. In the video decoder 204, the decoding processing is applied to the video stream VS extracted at the system decoder 203, whereby the transmission video data V1 is obtained.

In addition, in the video decoder 204, the parameter set and the SEI message inserted into each of the access units constituting the video stream VS are extracted to be sent to the control unit 201. As described above, in the control unit 201, a fact that the video stream supports the HDR is recognized, while a fact that the SEI should be referenced during the HDR display is also recognized. Accordingly, the meta information "Transfer characteristics" specifying the HDR electrooptical conversion characteristic, which is inserted into a field for the VUI in the SPS NAL unit, as well as the dynamic range SEI message (refer to FIG. 7) are extracted.

Under the control of the control unit 201, the HDR electrooptical converter 205 is set with the HDR electrooptical conversion characteristic specified by the meta information "Transfer characteristics", namely, the HDR electrooptical conversion characteristic corresponding to the HDR optoelectrical conversion characteristic used at the transmitting side. In the HDR electrooptical converter 205, the set HDR electrooptical conversion characteristic is applied to the transmission video data V1 output from the video decoder 204, whereby the display video data for displaying the HDR image is obtained.

The display video data obtained at the HDR electrooptical converter 205 is supplied to the HDR display mapping unit 206. In the HDR display mapping unit 206, the display brightness of the display video data is adjusted on the basis of the meta information for display control. Specifically, in a case where the CE monitor 207 has the maximum brightness display capability equal to EP higher than PL, the display mapping processing, namely, brightness conversion processing is carried out in the HDR display mapping unit 206 such that the maximum display brightness level is shifted to EP for levels exceeding the brightness at CL from among the output brightness levels of the HDR electrooptical converter 205 (refer to the two-dot chain line a' in FIG. 13). Alternatively, the display mapping processing, namely, the brightness conversion processing is carried out for levels exceeding the reference brightness level such that the maximum display brightness level is shifted to EP (refer to the one-dot chain line b' in FIG. 13).

In addition, the display brightness adjustment processing is not carried out in the HDR display mapping unit 206 in a case where "mapping protection flag" in the high dynamic range descriptor and the dynamic range SEI message is assigned to "1" to indicate that the display mapping is prohibited. Accordingly, the display video data obtained at the HDR electrooptical converter 205 is output as it is.

The output video data from the display mapping unit 206 is supplied to the CE monitor 207. The HDR image is displayed on this CE monitor 207.

As described thus far, in the transmission/reception system 10 illustrated in FIG. 1, the meta information "Transfer characteristics" specifying the electrooptical conversion characteristic corresponding to the high dynamic range optoelectrical conversion characteristic is inserted into a field for the VUI in the SPS NAL unit in the video stream. Consequently, the electrooptical conversion processing for the transmission video data obtained using the HDR optoelectrical conversion characteristic can be favorably carried out at the receiving side when the HDR electrooptical conversion characteristic specified by the meta information "Transfer characteristics" is used therefor.

Additionally, in the transmission/reception system 10 illustrated in FIG. 1, the high dynamic range descriptor (High Dynamic Range descriptor) is inserted into the layer of the container (transport stream). This descriptor includes "HDR_flag" indicating whether the service stream (video stream) is of a type supporting the HDR. This allows the receiving side to easily recognize that the video stream supports the high dynamic range, whereby it is made possible to correctly extract the meta information "Transfer characteristics" indicating the electrooptical conversion characteristic corresponding to the high dynamic range optoelectrical conversion characteristic from the parameter set field in the video stream and perform proper electrooptical conversion on the transmission video data.

Meanwhile, in the transmission/reception system 10 illustrated in FIG. 1, the dynamic range SEI message (Dynamic Range SEI message) is inserted into the layer of the video stream. This SEI message includes the meta information for display control. Consequently, the display brightness control can be properly carried out at the receiving side using this meta information for display control. In this case, the meta information for display control includes the field information indicating a field where the display brightness adjustment is allowed such that the brightness conversion in accordance with, for example, the display brightness capability of the CE monitor 207 is performed only for the field where the brightness conversion is allowed. As a consequence, it is made possible to favorably reproduce a brightness atmosphere intended by the creator.

Furthermore, in the transmission/reception system 10 illustrated in FIG. 1, the high dynamic range descriptor and the dynamic range SEI message include the flag of "mapping_protection flag" indicating whether the display mapping (display brightness adjustment) is prohibited in the service stream (video stream). Consequently, adjustment exceeding the intent of the creator can be suppressed regarding the display brightness, or alternatively, eye fatigue of a viewer can be suppressed.

2. VARIATION

Note that the above embodiment has indicated an example where, in the reception device 200, the HDR electrooptical converter 205 carries out the electrooptical conversion processing and additionally, the HDR display mapping unit 206 carries out the brightness conversion processing in accordance with the maximum brightness display capability of the CE monitor 207. However, by reflecting a brightness conversion characteristic in the electrooptical conversion characteristic (EOTF) in advance, the electrooptical conversion processing and the brightness conversion processing can be simultaneously carried out by the HDR electrooptical converter 205 alone.

Figure 14:
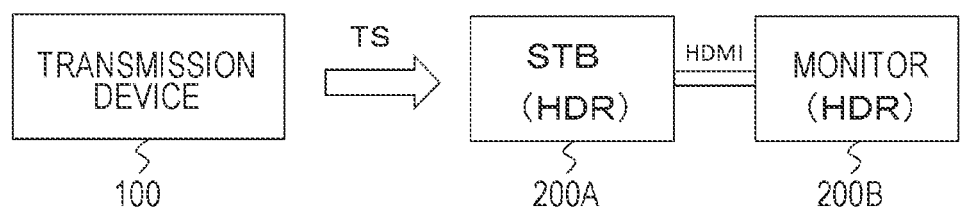
FIG. 14 is a block diagram illustrating another exemplary configuration of the transmission/reception system.

In addition, the above embodiment has indicated the transmission/reception system 10 constituted by the transmission device 100 and the reception device 200. However, the configuration of the transmission/reception system to which the present technology can be applied is not limited thereto. For example, as in a transmission/reception system 10A illustrated in FIG. 14, a section of the reception device 200 may be substituted by a configuration including a set top box (STB) 200A and a monitor 200B interconnected through a digital interface such as a High-Definition Multimedia Interface (HDMI). Note that "HDMI" is a registered trademark.

In this case, for example, the video decoder 204 and its preceding members are included in the set top box 200A and the electrooptical converter 205 and its subsequent members are included in the monitor 200B. The set top box 200A uses, for example, a packet of "Vender Specific InfoFrame" to send the meta information indicating the HDR optoelectrical conversion characteristic, the meta information for display control and so on to the monitor 200B.

FIG. 15 illustrates exemplary structures of a seventh byte and subsequent bytes in the packet of "Vender Specific InfoFrame" sent from the set top box 200A to the monitor 200B. Meanwhile, FIG. 16 illustrates content of primary information in the respective exemplary structures.

Three-bit information of "Display_control_type" is arranged from a seventh bit to a fifth bit in the seventh byte. This three-bit information represents a classification of a display type. "001" indicates SD display control, whereas "010" indicates HDR display control. "010" is employed here.

The flag of "mapping_protection_flag" is arranged in a fourth bit in the seventh byte. This flag indicates whether the display mapping (display brightness adjustment) after decoding is prohibited. "1" indicates that the display mapping is prohibited. "0" indicates that the display mapping is not prohibited. Four-bit information of "Display_control_metadata_length" is arranged from a third bit to a zeroth bit in the seventh byte. This four-bit information represents the size of "Display_control_metadata" arranged at the following place, in number of bytes. "12" is employed here.

Eight-bit information of "Transfer characteristics" is arranged in an eighth byte. This eight-bit information specifies the HDR electrooptical conversion characteristic. The electrooptical conversion characteristic for display is detected through this information. "0x10" is employed here. Eight-bit information of "Number of bits" is arranged in an 8+1st byte. This eight-bit information represents the number of encoded pixel bits.

Sixteen-bit information of "Minimum brightness value" is arranged in an 8+2nd byte and an 8+3rd byte. This sixteen-bit information represents a minimum level of the brightness ($cd/m^2$). Sixteen-bit information of "Peak Level" is arranged in an 8+4th byte and an 8+5th byte. This sixteen-bit information represents a relative value (%) at a maximum level.

Sixteen-bit information of "Peak Level Brightness" is arranged in an 8+6th byte and an 8+7th byte. This sixteen-bit information represents a maximum level of the brightness ($cd/m^2$). Sixteen-bit information of "Compliant_threshold_level" is arranged in an 8+8th byte and an 8+9th byte. This sixteen-bit information represents a threshold (%) during the display level mapping. Sixteen-bit information of "Compliant_threshold_level_value" is arranged in an 8+10th byte and an 8+11th byte. This sixteen-bit information represents the brightness ($cd/m^2$) functioning as the threshold during the display level mapping. Note that threshold information constituted by "Compliant_threshold_level" and "Compliant_threshold_level_value" can be sent as 100% indicating reference brightness and the reference brightness, respectively. In addition, the above-mentioned information transmission from the set top box 200A to the monitor 200B is not limited to a case using the packet of "Vender Specific InfoFrame" and it is apparent that defining another packet of InfoFrame enables the transmission similarly.

Furthermore, the above embodiment has indicated an example where the transport stream (MPEG-2 TS) serves as the container. However, the transport according to the present technology is not limited to TS and, also in the case of another packet such as ISOBMFF or MMT, the video layers can be implemented using the same method.

Figure 17:
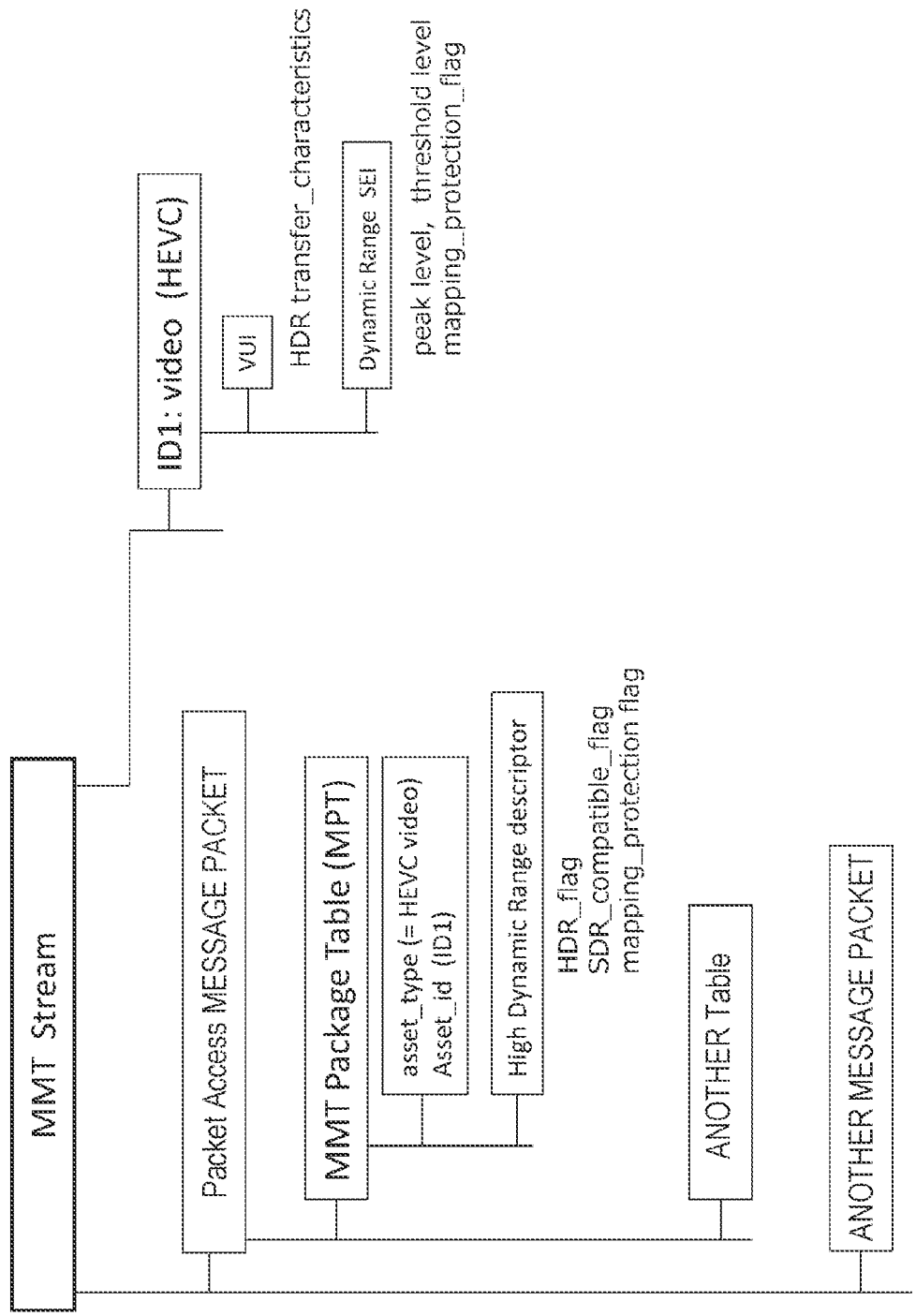
FIG. 17 is a diagram illustrating an exemplary configuration of an MMT stream.

FIG. 17 illustrates an MMT structure. An MMT stream has an MMT packet for each of assets such as video and audio. According to the illustrated example, the MMT packet identified by ID1 is provided as the video asset. The meta information "Transfer characteristics" specifying the HDR electrooptical conversion characteristic is inserted into a field for the VUI in the SPS in the access unit. Meanwhile, the dynamic range SEI message in which the peak level "Peak level", the threshold level "Threshold level", a mapping protection flag "mapping protection flag" and so on are stated is inserted into the access unit.

In addition, the MMT stream has a message packet such as a packet access (PA) message packet. The PA message packet includes tables such as an MP table (MMT Package Table). The MP table includes information on each of the assets. Here, the high dynamic range descriptor in which the HDR flag "HDR flag", the SDR compatible flag "SDR compatible flag", the mapping protection flag "mapping protection flag" and so on are stated is inserted in association with the video asset.

Note that the present technology can be also configured as described below.

(1) A transmission device including:
an optoelectrical converter that performs high dynamic range optoelectrical conversion on high dynamic range video data to obtain transmission video data;
an encoding unit that applies encoding processing to the transmission video data to obtain a video stream;
a transmitter that transmits a container in a predetermined format including the video stream; and
an information inserter that inserts meta information indicating an electrooptical conversion characteristic corresponding to a characteristic of the high dynamic range optoelectrical conversion into a parameter set field in the video stream.

(2) The transmission device according to the aforementioned (1), in which
the parameter set field is a field in an SPS NAL unit.

(3) The transmission device according to the aforementioned (1) or (2), in which
the information inserter further inserts, into a layer of the container, identification information indicating that the video stream supports the high dynamic range.

(4) The transmission device according to the aforementioned (3), in which
information indicating whether the video stream has display compatibility with a normal dynamic range is added to the identification information.

(5) The transmission device according to the aforementioned (3) or (4), in which
information indicating whether display brightness adjustment for the video stream is prohibited is added to the identification information.

(6) The transmission device according to any one of the aforementioned (3) to (5), in which
the container is a transport stream, and
the information inserter inserts the identification information into a section belonging to one of a program map table and an event information table.

(7) The transmission device according to any one of the aforementioned (3) to (5), in which
the container is an MMT stream, and
the information inserter inserts the identification information into a section belonging to an MMT package table.

(8) The transmission device according to any one of the aforementioned (1) to (7), in which
the information inserter further inserts the meta information for display control into a field different from the parameter set field in the video stream.

(9) The transmission device according to the aforementioned (8), in which
the meta information for display control includes peak brightness information.

(10) The transmission device according to the aforementioned (8) or (9), in which
the meta information for display control includes field information indicating a field where the display brightness adjustment is allowed.

(11) The transmission device according to any one of the aforementioned (8) to (10), in which the meta information for display control includes information indicating whether display brightness adjustment for the video stream is prohibited.

(12) The transmission device according to any one of the aforementioned (8) to (11), in which
the field different from the parameter set field is a field in an SEI NAL unit.

(13) A transmission method including:
an optoelectrical conversion step of performing high dynamic range optoelectrical conversion on high dynamic range video data to obtain transmission video data;
an encoding step of applying encoding processing to the transmission video data to obtain a video stream;
a transmission step of transmitting a container in a predetermined format including the video stream through a transmitter; and
an information insertion step of inserting meta information indicating an electrooptical conversion characteristic corresponding to a characteristic of the high dynamic range optoelectrical conversion into a parameter set field in the video stream.

(14) A reception device including:
a receiver that receives a container in a predetermined format including a video stream obtained by encoding transmission video data;
a decoding unit that applies decoding processing to the video stream to obtain the transmission video data; and
an electrooptical converter that performs electrooptical conversion on the transmission video data obtained at the decoding unit to obtain display video data, in which
the transmission video data is data obtained by applying high dynamic range optoelectrical conversion to high dynamic range data, and
meta information indicating an electrooptical conversion characteristic corresponding to a characteristic of the high dynamic range optoelectrical conversion is inserted into a parameter set field in the video stream,
the reception device further including an information extractor that extracts the meta information from the video stream, in which
the electrooptical converter uses the electrooptical conversion characteristic indicated by the meta information extracted at the information extractor.

(15) The reception device according to the aforementioned (14), in which
the parameter set field is a field in an SPS NAL unit.

(16) The reception device according to the aforementioned (14) or (15), in which
identification information indicating that the video stream supports the high dynamic range is inserted into a layer of the container, and
the information extractor extracts the meta information from the parameter set field in the video stream on the basis of the identification information.

(17) The reception device according to any one of the aforementioned (14) to (16), in which
the meta information for display control is included in a field different from the parameter set field in the video stream,
the reception device further including a brightness adjustment unit that adjusts display brightness of the display video data on the basis of the meta information for display control.

(18) The reception device according to the aforementioned (17), in which
the meta information for display control includes field information indicating a field where the display brightness adjustment is allowed, and
the brightness adjustment unit adjusts the display brightness of the field where the display brightness adjustment is allowed.

(19) The reception device according to the aforementioned (17) or (18), in which
information indicating whether the display brightness adjustment for the video stream is prohibited is inserted into a layer of the container and/or a layer of the video stream, and
the brightness adjustment unit does not adjust the display brightness of the display video data in a case where the information indicating whether the display brightness adjustment for the video stream is prohibited indicates the prohibition thereof.

(20) A reception method including:
a reception step of receiving, through a receiver, a container in a predetermined format including a video stream obtained by encoding transmission video data;
a decoding step of applying decoding processing to the video stream to obtain the transmission video data; and
an electrooptical conversion step of performing electrooptical conversion on the transmission video data obtained through the decoding step to obtain display video data, in which
the transmission video data is data obtained by applying high dynamic range optoelectrical conversion to high dynamic range data,
meta information indicating an electrooptical conversion characteristic corresponding to a characteristic of the high dynamic range optoelectrical conversion is inserted into a parameter set field in the video stream, and
the electrooptical conversion characteristic indicated by the meta information is used during the electrooptical conversion step.

The principal characteristic of the present technology is to insert the meta information specifying the electrooptical conversion characteristic corresponding to the high dynamic range optoelectrical conversion characteristic into the SPS NAL unit in the video stream, thereby ensuring that the electrooptical conversion processing for the transmission video data obtained using high dynamic range optoelectrical conversion characteristic is favorably carried out at the receiving side (refer to FIG. 11).

REFERENCE SIGNS LIST 10, 10A Transmission/reception system
100 Transmission device
101 Control unit
102 HDR camera
103 HDR optoelectrical converter
103a Master monitor
104 Video encoder
105 System encoder
106 Transmitter
200 Reception device
200A Set top box
200B Monitor
201 Control unit
202 Receiver
203 System decoder 204 Video decoder
205 HDR electrooptical converter
206 HDR display mapping unit
207 CE monitor

The invention claimed is:

1. A transmission device comprising:
an optoelectrical converter circuitry configured to perform high dynamic range optoelectrical conversion on high dynamic range video data to obtain transmission video data; and
a processing circuitry configured to:
encode the transmission video data to obtain a video stream;
transmit a container in a predetermined format including the video stream; and
insert meta information indicating an electro-optical conversion characteristic corresponding to a characteristic of the high dynamic range optoelectrical conversion into a parameter set field in the video stream, the parameter set field being a field for video usability information (VUI),
wherein the processing circuitry is further configured to insert meta information for a display control into a field different from the parameter set field in the video stream, and insert, into a layer of the container, identification information indicating that the video stream supports the high dynamic range, wherein information indicating whether the display brightness adjustment for the video stream is prohibited is added to the identification information, and
wherein the meta information for the display control includes one or more of: (a) peak brightness information, (b) field information indicating a field where a display brightness adjustment is allowed, and (c) information indicating whether the display brightness adjustment for the video stream is prohibited.

2. The transmission device according to claim 1, wherein the parameter set field is a field in a Sequence Parameter Set Network Abstraction Layer (SPS NAL) unit.

3. The transmission device according to claim 1, wherein information indicating whether the video stream has display compatibility with a normal dynamic range is added to the identification information.

4. The transmission device according to claim 1, wherein the container is a transport stream, and the processing circuitry inserts the identification information into a section belonging to one of a program map table and an event information table.

5. The transmission device according to claim 1, wherein the container is a MPEG Media Transport (MMT) stream, and the processing circuitry inserts the identification information into a section belonging to an MMT package table.

6. A transmission method implemented by a transmission device, the transmission method comprising:
performing high dynamic range optoelectrical conversion on high dynamic range video data to obtain transmission video data;
encoding the transmission video data to obtain a video stream;
transmitting a container in a predetermined format including the video stream through a transmitter; and
inserting meta information indicating an electro-optical conversion characteristic corresponding to a characteristic of the high dynamic range optoelectrical conversion into a parameter set field in the video stream, the parameter set field being a field for video usability information (VUI),
wherein the inserting further comprises inserting meta information for a display control into a field different from the parameter set field in the video stream, and inserting, into a layer of the container, identification information indicating that the video stream supports the high dynamic range, wherein information indicating whether the display brightness adjustment for the video stream is prohibited is added to the identification information, and
wherein the meta information for the display control includes one or more of: (a) peak brightness information, (b) field information indicating a field where a display brightness adjustment is allowed, and (c) information indicating whether the display brightness adjustment for the video stream is prohibited.

7. A reception device comprising:
a receiver that receives a container in a predetermined format including a video stream obtained by encoding transmission video data; and
a processing circuitry configured to
decode the video stream to obtain the transmission video data, and
perform electro-optical conversion on the transmission video data to obtain display video data,
wherein the transmission video data is data obtained by applying high dynamic range optoelectrical conversion to high dynamic range data and inserting meta information indicating an electro-optical conversion characteristic corresponding to a characteristic of the high dynamic range optoelectrical conversion is inserted into a parameter set field in the video stream, and meta information for a display control included in a field different from the parameter set field in the video stream, the parameter set field being a field for video usability information (VUI),
wherein the meta information for the display control includes one or more of: (a) peak brightness information, (b) field information indicating a field where a display brightness adjustment is allowed, and (c) information indicating whether the display brightness adjustment for the video stream is prohibited the reception device,
wherein the processing circuitry is further configured to extract the meta information from the video stream,
wherein the electro-optical conversion uses the electro-optical conversion characteristic indicated by the extracted meta information,
wherein the processing circuitry is further configured to adjust display brightness of the display video data based on the meta information for the display control,
wherein identification information indicating that the video stream supports the high dynamic range is inserted into a layer of the container, and
wherein information indicating whether the display brightness adjustment for the video stream is prohibited is inserted into a layer of the container and/or a layer of the video stream.

8. The reception device according to claim 7, the processing circuitry is further configured to extract the meta information from the parameter set field in the video stream based on the identification information.

9. The reception device according to claim 7, the display brightness of the display video data is not adjusted in a case where the information indicating whether the display brightness adjustment for the video stream is prohibited indicates prohibition thereof.

10. A reception method implemented by a reception device, the reception method comprising:
- receiving, through a receiver, a container in a predetermined format including a video stream obtained by encoding transmission video data;
- decoding the video stream to obtain the transmission video data; and
- performing an electro-optical conversion on the transmission video data to obtain display video data,
- wherein the transmission video data is data obtained by applying high dynamic range optoelectrical conversion to high dynamic range data and inserting meta information indicating an electro-optical conversion characteristic corresponding to a characteristic of the high dynamic range optoelectrical conversion into a parameter set field in the video stream, the parameter set field being a field for video usability information (VUI),
- wherein the electro-optical conversion characteristic indicated by the meta information is used during the electro-optical conversion,
- wherein the meta information for a display control is included in a field different from the parameter set field in the video stream,
- wherein the meta information for the display control includes one or more of: (a) peak brightness information, (b) field information indicating a field where a display brightness adjustment is allowed, and (c) information indicating whether the display brightness adjustment for the video stream is prohibited,
- wherein the reception method further includes adjusting display brightness of the display video data based on the meta information for the display control,
- wherein identification information indicating that the video stream supports the high dynamic range is inserted into a layer of the container, and
- wherein information indicating whether the display brightness adjustment for the video stream is prohibited is inserted into a layer of the container and/or a layer of the video stream.

* * * * *